(No Model.)
A. W. FOSTER.
CLOTHES LINE REEL.
No. 523,853.  Patented July 31, 1894.
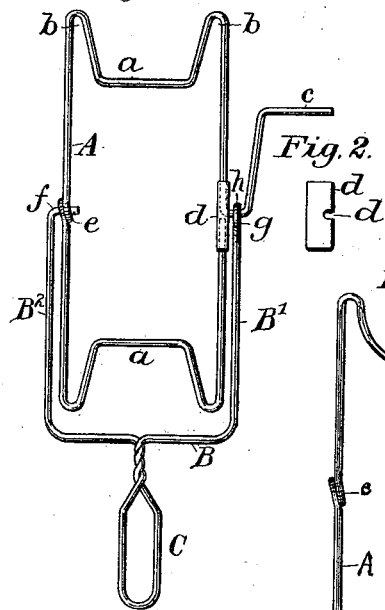
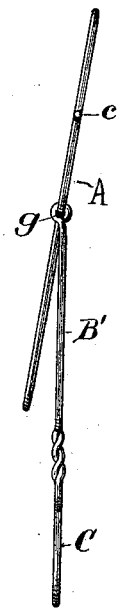
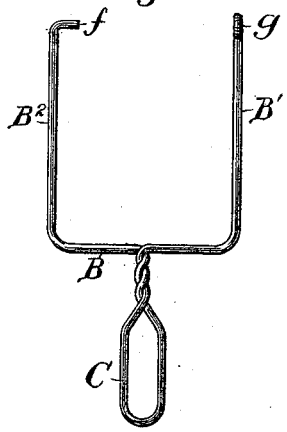
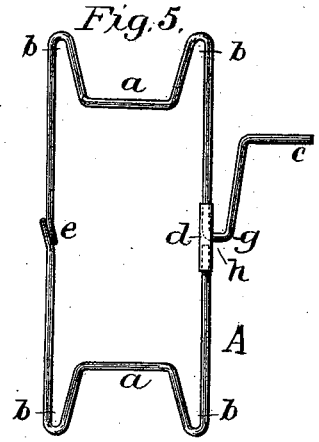
Witnesses:
Joseph E. Gehres.
Frank A. Foster
Inventor:
Albert W. Foster
By Fred W. Bond
Attorney.

UNITED STATES PATENT OFFICE.

ALBERT W. FOSTER, OF AKRON, ASSIGNOR OF ONE-HALF TO FRANK A. FOSTER, OF CANTON, OHIO.

CLOTHES-LINE REEL.

SPECIFICATION forming part of Letters Patent No. 523,853, dated July 31, 1894.

Application filed April 12, 1893. Serial No. 470,121. (No model.)

*To all whom it may concern:*

Be it known that I, ALBERT W. FOSTER, a citizen of the United States, residing at Akron, in the county of Summit and State of Ohio, have invented certain new and useful Improvements in Clothes-Line Reels; and I do hereby declare that the following is a full, clear, and exact description of the same, reference being had to the annexed drawings, making a part of this specification, and to the letters of reference marked thereon, in which—

Figure 1 is a side elevation, showing the reel properly attached to its frame. Fig. 2 is a detached view of the connecting clip. Fig. 3 is an edge view of the reel and its frame. Fig. 4 is a detached view of the frame. Fig. 5 is a view of the reel. Fig. 6 is a detached view of the reel showing modified form of its ends.

The present invention has relation to clothes-line reels and it consists in the novel construction hereinafter described and particularly pointed out in the claim.

Similar letters of reference indicate corresponding parts in all the figures of the drawings.

In the accompanying drawings A represents the reel, which is formed of a single piece of wire. The ends of the reel A are bent or formed substantially as shown in Figs. 1 and 5 and are so formed for the purpose of providing end recesses $a$ to receive and hold the laps of the line. The recesses $a$ are formed by bending a portion of the reel wire toward its center, thereby providing the open loops $b$, which open loops are for the purpose of connecting the end of the line or cord to the reel, and thereby providing a means for starting the same to wind around, or across the reel, as said reel is revolved. The end of the line or cord is preferably attached to one of the open loops by means of a knot formed upon the end of the cord, and of such a size that the knot will not pass between the bars forming the open loops; or if desired the cord may be tied to the wire. At one side of the reel, the wire of which the reel is composed is bent substantially at right angles a short distance to form an axle or journal $h$, upon which in connection with the axle $f$, of the frame B, the reel may be revolved. The wire forming the journal $h$ is continued so as to form the handle or crank $c$. The meeting portions of the reel A are securely attached together by means of the connecting clip or sleeve $d$, which clip or sleeve consists of a sheet of metal formed of a sufficient size to be wrapped around the wire of the reel. After the clip or sleeve has been properly wrapped, or placed around the portion of the reel, which it covers, the meeting faces of said clip or sleeve are securely soldered or otherwise attached together, thereby providing a rigid connection for the meeting portion of the reel proper. For the purpose of providing a means for passing the axle $h$, the clip or sleeve $d$, is provided with the notch or recess $d'$. Upon the opposite side of the reel A from that on which the crank $c$ is located the loop or eye $e$ is formed by lapping the wire of the reel.

The frame B is substantially of the form shown in Figs. 1, 3 and 4 and as shown it is provided with parallel arms B' and B². The arm B² is provided with the right angled portion $f$, which right angled portion $f$ receives or enters the eye $e$. The opposite arm B' is provided with the eye or loop $g$, which eye or loop embraces the right angled portion or journal $h$. It will be understood that by providing the right angled portion $f$ and the axle $h$ that suitable bearings will be provided for the reel proper by means of the eyes $e$, and $g$.

The frame B is provided with the open handle C, which open handle may be located substantially as illustrated in Figs. 1, 3 and 4 and is for the purpose of holding the frame and reel during the time a line or cord is being wrapped or wound, upon the reel, and at the same time providing a convenient means for suspending the reel, together with a line from a pin or nail or their equivalents.

In Fig. 6 the reel A is provided with concaved ends $a'$, which are for the same purpose as the recesses $a$.

Having fully described my invention, what I claim as new, and desire to secure by Letters Patent, is—

The combination of a reel formed of a single piece of wire, and provided with end recesses and open loops, and a crank or handle c, located to one side of the reel, and the eye e, and the frame B, provided with the arms B' and B², and the axle f, and the eye g, substantially as and for the purpose specified.

In testimony that I claim the above I have hereunto subscribed my name in the presence of two witnesses.

ALBERT W. FOSTER.

Witnesses:
F. A. FOSTER,
F. W. BOND.